United States Patent [19]

Frömel et al.

[11] Patent Number: 4,683,115

[45] Date of Patent: Jul. 28, 1987

[54] NUCLEAR REACTOR FUEL ASSEMBLY

[75] Inventors: Gustav Frömel, Erlangen; Alexander Steinke, Ebermannstadt, both of Fed. Rep. of Germany

[73] Assignee: Kraftwerk Union Aktiengesellschaft, Mülheim/Ruhr, Fed. Rep. of Germany

[21] Appl. No.: 643,888

[22] Filed: Aug. 24, 1984

[30] Foreign Application Priority Data

Aug. 26, 1983 [DE] Fed. Rep. of Germany ....... 3330850

[51] Int. Cl.$^4$ ............................................. G21C 3/34
[52] U.S. Cl. ..................................... 376/439; 376/442
[58] Field of Search ............... 376/438, 439, 440, 442

[56] References Cited

U.S. PATENT DOCUMENTS

| | | | |
|---|---|---|---|
| 3,751,335 | 8/1973 | Keith | 376/442 |
| 3,932,216 | 1/1976 | Jabsen | 376/442 |
| 4,090,918 | 5/1978 | Masetti | 376/442 |
| 4,239,597 | 12/1980 | Christiansen | 376/442 X |
| 4,388,269 | 6/1983 | Larson | 376/442 |
| 4,489,038 | 12/1984 | Nylund | 376/438 X |

Primary Examiner—Peter A. Nelson
Attorney, Agent, or Firm—Herbert L. Lerner; Laurence A. Greenberg

[57] ABSTRACT

Nuclear reactor fuel assembly having a grid-shaped spacer with square grid meshes, wherein mutually parallel rods are arranged, respectively, in a grid mesh, the spacer having flat outer straps extending transversely to the rods and an intermediate strip extending parallel to the rods between two of the respective outer straps, the intermediate strip being inclined relative to the two outer straps, including a rejection rise formed at the outside of the intermediate strip and extending in direction of a diagonal of a grid mesh located at a corner between the two outer straps, the rejection rise being disposed transversely to the two outer straps and being inclined downwardly towards two respective ends of the intermediate strip in longitudinal direction of the rods.

6 Claims, 4 Drawing Figures

ND this page.

NUCLEAR REACTOR FUEL ASSEMBLY

The invention relates to a nuclear reactor fuel assembly having a grid-shaped spacer with square grid meshes, wherein mutually parallel rods, particularly fuel rods containing nuclear fuel, are arranged, respectively, in a grid mesh, the spacer having flat outer straps extending transversely to the rods, and an intermediate strip extending parallel to the rods between two of the respective outer straps, the intermediate strip being inclined to the two outer straps.

Such a nuclear reactor fuel assembly is already in use. It has one end part formed of a head member, and another end part formed of a base member. These two end parts are connected to one another by control rod guide tubes. Each of the control rod guide tubes is detachably connected by one end thereof, respectively, to a head plate of the head member and by the other end thereof, respectively, to a base plate of the base member, for example, by a threaded connection. The control rod guide tubes pass perpendicularly through the head and base plates. The head and base plates are rectangular and, ordinarily, are square.

The control rod guide tubes are guided, respectively, in a square grid mesh through several rectangular, likewise ordinarily square, grid-shaped spacers which generally have a like spacing from one another as viewed in direction of the longitudinal axis of the control rod guide tubes and therefore also in direction of the fuel assembly, and which are aligned one with the other and with the head and base plates. Fuel rods, which contain nuclear fuel in hermetically sealed cladding tubes, are guided or extended through the square grid meshes of the spacer which are not occupied by the control rod guide tubes. These fuel rods are neither fastened to the head plate of the head member nor to the base plate of the base member, but rather have play in longitudinal direction between the head and the base plates and can therefore expand or elongate freely in direction of the longitudinal axis thereof i.e. in longitudinal direction of the fuel assembly.

In the reactor core of a pressurized-water nuclear reactor in particular, a series of such nuclear reactor fuel assemblies of identical construction are arranged closely adjacent one another with parallel longitudinal axes in a checkerboard patters. During the loading and unloading of the nuclear reactor with the individual nuclear reactor fuel assemblies, adjacent nuclear reactor fuel assemblies might become hooked together in the reactor core on the outer straps of the spacers, which results in the destruction of these outer straps and makes replacement of the nuclear reactor fuel assemblies impossible. Nuclear reactor fuel assemblies which may have become greatly curved or bent due to operating stresses in the reactor core especially have a tendency to getting hooked together.

For this reason, two edges of the outer straps of the spacers, namely the two edges perpendicular to the rods, i.e. to the control rod guide tubes and the fuel rods of the nuclear reactor fuel assembly, have already been provided with slightly inwardly-inclined rejection tabs, at which, when loading and unloading the reactor core, the corresponding edges of the outer straps of the spacers which are perpendicular to the rods of laterally adjacent nuclear reactor fuel assemblies moving relative to one another and to the first-mentioned reactor fuel assembly can slide off, so that the respective fuel assemblies are prevented from getting hooked at these edges.

Such inwardly-inclined rejected tabs, however, cannot be arranged at the corners of a spacer of the nuclear reactor fuel assembly at which the corner rods of the nuclear reactor fuel assembly, mostly fuel rods, are located in a square corner grid mesh between two orthogonal or mutually perpendicular outer straps because they degrade thereat the thermohydraulic conditions for the coolant in the nuclear reactor to such a degree that the corner rods are not cooled sufficiently and may therefore become damaged. The danger therefore exists that diagonally adjacent nuclear reactor fuel assemblies in the checkerboard pattern in the reactor core become hooked with the corners of the spacers thereof during loading and unloading of the nuclear reactor. Even chamfering or forming inclinations in these corners does not provide the desired reliable protection against getting hooked, in extreme cases.

In is accordingly an object of the invention to provided a nuclear reactor fuel assembly which cannot become hooked with a diagonally adjacent nuclear reactor fuel assembly in the nuclear reactor at the corners of the spacers therefore during the loading and unloading of the nuclear reactor.

With the foregoing and other objects in view, there is provided in accordance with the invention, a nuclear reactor fuel assembly having a grid-shaped spacer with square grid meshes, wherein mutually parallel rods are arranged, respectively, in a grid mesh, the spacer having flat outer straps extending transversely to the rods and an intermediate strip extending parallel to the rods between two of the respective outer straps, the intermediate strip being inclined relative to the two outer straps, comprising a rejection rise formed at the outside of the intermediate strip and extending in direction of a diagonal of a grid mesh located at a corner between the two outer straps, the rejection rise being disposed transversely to the two outer straps and being inclined downwardly towards two respective ends of the intermediate strip in longitudinal direction of the rods.

The rejection rises in the checkerboard pattern of diagonally adjacent nuclear reactor fuel assemblies can, respectively, engage the corner rod of the other nuclear reactor fuel assembly and force the two diagonally adjacent nuclear reactor fuel assemblies diagonally apart. During the relative movement of the two diagonally adjacent nuclear reactor fuel assemblies in longitudinal direction during the loading or unloading of the nuclear reactor, the ends of the intermediate strips at the spacers of the diagonally adjacent nuclear reactor fuel assemblies are therefore pushed away from one another to such an extent that they can no longer be hooked together if they should finally slide over one of the chamfers or inclinations at the rejection rises of the diagonally adjacent nuclear reactor fuel assembly.

In accordance with another feature of the invention, the rejection rise is located on a spring strip suspended from the ends of the intermediate strip.

In accordance with a further feature of the invention, the rejection rise is located on a fishplate on one of the outer straps, the fishplate forming the intermediate strip and being secured at an inner side thereof to the other outer strap. This simplifies the fabrication of the spacer.

In accordance with an additional feature of the invention, the two outer straps are inclined at respective corners starting from edges thereof and extending towards the intermediate strip, and form chamfers of like inclination.

In accordance with an added feature of the invention there is provided a rectilinear inclination continued from the respective outer straps into the intermediate strip and forming a pointed cutout at the ends of the intermediate strip.

In accordance with a concomitant feature of the invention, the rejection rise is formed by a tab cut out of said fishplate on the one outer strap and is disposed in the plane of this one outer strap, the tab being formed at lateral edges thereof with respective pointed cutouts, the points of said cutouts being located on a bending edge extending parallel to the rods, said tab being bent perpendicularly at the bending edge into a plane wherein the other outer strap is disposed, the tab being secured to the outside of the other outer strap.

Other features which are considered as characteristics for the invention are set forth in the appended claims.

Although the invention is illustrated and described herein as embodied in nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
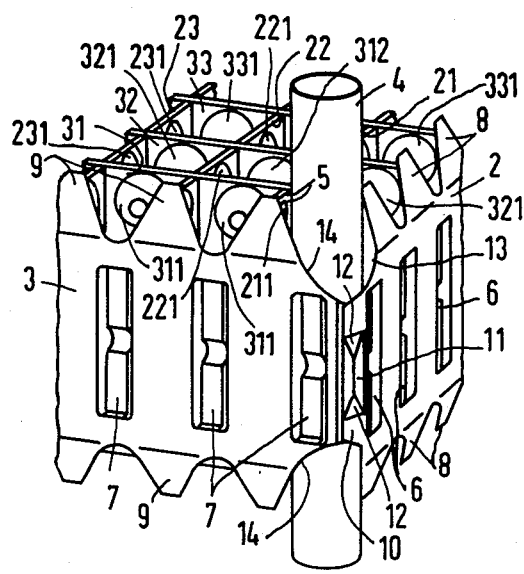
FIG. 1 is a fragmentary, right side and top perspective view of part of a square spacer with square grid meshes of a nuclear reactor fuel assembly according to the invention.

Referring now to the drawing and first, particularly, to FIG. 1 thereof, there is shown a square, grid-shaped spacer, formed of a nickel-iron alloy in a nuclear reactor fuel assembly according to the invention, the spacer being mode up of two flat, planar outer straps 2 and 3 which are disposed at right angles to one another. On the inside of these outer straps 2 and 3, inner straps 21 to 23 are arranged which are parallel to the outer strap 2, and inner straps 31 to 33 which are parallel to the outer strap 3 and which mutually intersect at right angles, forming square grid meshes. In these meshes, respectively, a control rod guide tube or a nuclear fuel-containing fuel rod of the nuclear reactor fuel assembly is arranged, the inner and outer straps being disposed perpendicularly thereto. In the interest of greater clarity, only a single fuel rod 4 is shown in the outermost square corner grid mesh 5 formed by the outer straps 2 and 3 of the spacer, the lateral surfaces of the inner and outer straps being parallel to the longitudinal direction of the fuel rod 4 i.e. the inner and outer straps 2 and 3 being arranged on edge. Inside the square grid meshes, the inner straps 21 to 23 and 31 to 33 are formed with firm bumps 311, 321 and 331 as well as 211, 221 and 231 and are provided with springs corresponding to inwardly-directed springs 6 of the outer strap 2 and inwardly-directed springs 7 of the outer strap 3. The bumps and springs provide the grid-shaped spacer with a positive locking support for the control rod guide tubes extending through individual grid meshes, and a positive locking support in the spacer for fuel rods extended through other grid meshes. At the edges extending in the spacer perpendicularly to the mutually parallel control-rod guide tubes and fuel rods, the outer straps 2 and 3 have slightly inwardly inclined rejection tabs 8 and 9.

The outer straps 2 and 3 are connected to one another by means of an intermediate strip 10 which is located between these two outer straps 2 and 3 at the outer edge of the spacer, that outer edge being parallel to the mutually parallel control rod guide tubes and fuel rods, the intermediate strip 10 being likewise parallel to these control rod guide tubes and fuel rods. This intermediate strip 10 is formed by a fishplate on the outer strap 2 which overlaps with a corresponding fishplate on the outer strap 3 and is welded at an inner side thereof to the fishplate on the outer strap 3. The intermediate strip 10 is flat and planar and is inclined relative to the two outer straps 2 and 3, respectively, at an angle of 45° i.e. this intermediate strip 10 is perpendicular to the diagonal of the corner grid mesh 5 and, thereby, to the spacer diagonal between the two outer straps 2 and 3. On the outside of this intermediate strip 10, in the middle between the ends thereof, at the edges of the outer straps 2 and 3 perpendicular to the control rod guide tubes and the fuel rods in the spacer, a rejection or refusal rise 11 is provided which is formed by being embossed or stamped out of the fishplate on the outer strap 2 in the respective directions of the diagonal of the corner grid mesh 5 and the spacer diagonal between the two outer straps 2 and 3. This rejection rise 11 is inclined transversely to the two outer straps 2 and 3 and towards the two ends of the intermediate strip 10 i.e. in longitudinal direction of the control rod guide tubes and the fuel rods contained in the spacer, forming respective chamfered surfaces 12. In addition, the two outer straps 2 and 3 are inclined at the corners, starting from the edges thereof perpendicularly to the control rod guide tubes and fuel rods contained in the spacer and towards the intermediate strip 10 located between these outer straps 2 and 3, forming thereby chamfers 13 and 14 of like inclination.

Figure 2:
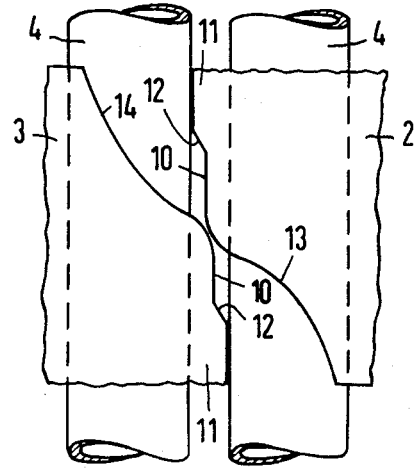
FIG. 2 is an enlarged, fragmentary diagrammatic sectional view taken in direction of the diagonal of grid meshes of spacers at a corner of a nuclear reactor fuel assembly and therewith also of the spacers of a pair of nuclear reactor fuel assemblies according to FIG. 1 which are arranged diagonally side by side in a checkerboard pattern in a reactor core.

As is shown in FIG. 2, the rejection rises 11 alternatingly engage the respective fuel rods 4 in the corner grid mesh 5 if there is relative movement in longitudinal direction of two parallel nuclear reactor fuel assemblies arranged diagonally adjacent one another in the checkerboard pattern with spacers constructed in accordance with FIG. 1, and thereby force the two intermediate strips 10 apart to such an extent that the two intermediate strips 10 of the two diagonally adjacent spacers, and consequently the nuclear reactor fuel assemblies, cannot become hooked at the ends thereof when there is relative movement of the fuel rods 4 in the longitudinal direction.

Figure 3:
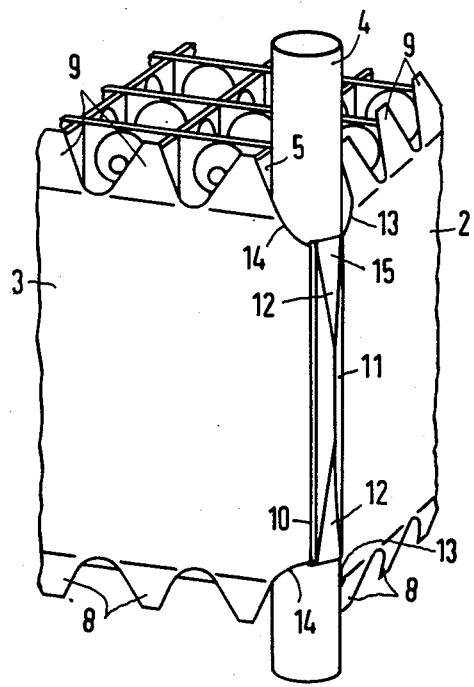
FIGS. 3 and 4 are perspective views like that of FIG. 1 of parts of two additional embodiments having modified spacers of nuclear reactor fuel assemblies according to the invention.

In FIG. 3, like parts of the grid-shaped square spacer are identified by the same reference characters as in FIG. 1, but the bumps and springs in the individual grid meshes are not shown. The spacer according to FIG. 3 differs from that of FIG. 1 in that the intermediate strip 10 is formed flat and planar between the two outer straps 2 and 3 which are welded together therewith, and in that a spring strip 15 is suspended from the ends of this intermediate strip 10 which are located at the edges of the outer straps 2 and 3 which are perpendicular to the control rod guide tubes and fuel rods in the spacer. This spring strip 15 is formed of spring steel and covers the intermediate strip 10. Furthermore, this spring strip 15 has, in the middle, between the ends thereof, a rejection rise 11 which, like the rejection rise 11 of the spacer according to FIG. 1 projects outwardly, respectively, in the diagonal of the corner grid mesh 5 and in the spacer diagonal between the two outer straps 2 and 3, and is inclined transversely to the two outer straps 2 and 3, forming chamfered surfaces 12 in longitudinal direction of the fuel rod 4. This spring strip 15 can be retrofitted or applied afterwards to the previously manufactured grid-shaped spacer and is therefore well suited for retrofitting previously completed and already available nuclear reactor fuel assemblies.

Figure 4:
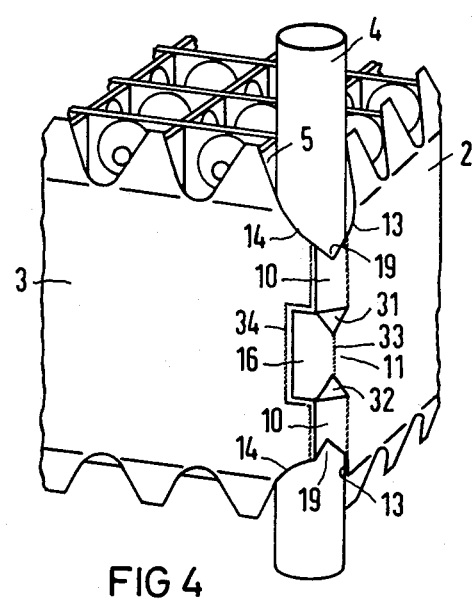

In the square spacer according to FIG. 4, like parts are also provided with the same reference characters as in the spacer according to FIG. 1. The spacer according to FIG. 4 differs from that of FIG. 1 in that the rejection rise 11 is formed by a tab 16 which is cut out in the middle of the fishplate forming the intermediate strip 10 on the outer strap 2. This tab 16 has, at both lateral edges thereof, a respective pointed cutout 31, 32. Respective points of these two cutouts 31 and 32 lie on a bending or folding edge 33 which is parallel to the rods in the spacer i.e. especially also to the control rod guide tube 4 in the corner grid mesh 5. At this folding edge 33, the tab 16 is bent or folded perpendicularly. The bent-away end of the tab 16 is soldered or welded to the outer side of the other outer strap 3 in a pre-stamped or pre-embossed depression 34 formed in the outer strip 3. The one part of the tab 16 which is formed on the one outer strap 2 and is limited by the bending or folding edge 33 lies in the plane of this outer strap 2, while the other part of the tab 16 virtually lies in the plane of the other outer strap 3 starting from the bending or folding edge 33. In the spacer according to FIG. 4, embossing of the rejection rise 11 is therefore avoided, which is particularly advantageous if this spacer is formed of a zirconium alloy. The chamfers or inclinations of the rejection rise 11 of FIG. 4 are formed by the edges of the tab 16 in the cutouts 31 and 32.

Advantageously, a rectilinear inclination 13 and 14 is continued, in the spacer according to FIG. 4 at the corners of the two outer straps 2 and 3, into the intermediate strips 10, forming a pointed cutout 19 at the two ends of this intermediate strip 10, so that thereat, a further improvement in the sliding-off of a spacer on a diagonally adjacent nuclear reactor fuel assembly in the checkerboard pattern is effected.

The foregoing is a description corresponding, in substance, to German application P 3330 850.0, dated Aug. 26, 1983, International priority of which is being claimed for the instant application, and which is hereby made part of this application. Any material discrepancies between the foregoing specification and the specification of the aforementioned corresponding German application are to be resolved in favor of the latter.

There are claimed:

1. Nuclear reactor fuel assembly having a grid-shaped spacer with square grid meshes, wherein mutually parallel rods are arranged, respectively, in a grid mesh, the spacer having flat outer straps extending transversely to the rods and an intermediate strip extending parallel to the rods between two of the respective outer straps, the intermediate strip being inclined relative to the two outer straps, comprising a rejection rise formed at the outside of the intermediate strip and extending outwardly and away from the grid meshes in direction of a diagonal of a grid mesh located at a corner betwen the two outer straps, said rejection rise being disposed transversely to the two outer straps and being inclined downwardly towards two respective ends of the intermediate strip in longitudinal direction of the rods.

2. Nuclear reactor fuel assembly according to claim 1 wherein said rejection rise is located on a spring strip suspended from the ends of the intermediate strip.

3. Nuclear reactor fuel assembly according to claim 1 wherein said rejection rise in located on a fishplate on one of the outer straps, said fishplate forming the intermediate strip and being secured at an inner side thereof to the other outer strip.

4. Nuclear reactor fuel assembly according to claim 1 wherein the two outer straps are inclined at respective corners starting from edges thereof and extending towards the intermediate strip, and form chamfers of like inclination.

5. Nuclear reactor fuel assembly according to claim 4, including a rectilinear inclination continued from the respective outer straps into the intermediate strip and forming a pointed cutout at the ends of the intermediate strip.

6. Nuclear reactor fuel assembly according to claim 3 wherein said rejection rise is formed by a tab cut out of said fishplate on the one outer strap and is disposed in the plane of this one outer strap, said tab being formed at lateral edges thereof with respective pointed cutouts, the points of said cutouts being located on a bending edge extending parallel to the rods, said tab being bent perpendicularly at said bending edge into a plane wherein the other outer strap is disposed, said tab being secured to the outside of the other outer strap.

* * * * *